May 20, 1952 H. L. COYNE 2,597,570

VARIABLE IMPULSE TRANSMITTER

Filed Dec. 23, 1948 3 Sheets-Sheet 1

INVENTOR
H. L. COYNE
BY J W Schmied
ATTORNEY

VARIABLE IMPULSE TRANSMITTER

Filed Dec. 23, 1948 3 Sheets-Sheet 2

INVENTOR
H. L. COYNE

BY J W Schmied
ATTORNEY

May 20, 1952 H. L. COYNE 2,597,570

VARIABLE IMPULSE TRANSMITTER

Filed Dec. 23, 1948 3 Sheets-Sheet 3

CODE RINGING — 12 SECONDS (APPROX.)

| | 5 SHORT | 4 SHORT | 3 SHORT | 2 SHORT | 1 SHORT | 1 SHORT, 1 LONG | 2 SHORT, 1 LONG | 3 SHORT, 1 LONG | 1 SHORT, 1 LONG, 1 SHORT | 1 LONG, 1 SHORT, 1 LONG |
|---|---|---|---|---|---|---|---|---|---|---|
| 1 | G | G | G | G | G | G | G | G | G | G |
| 2 | G | G | G | G | G | G | G | G | G | G |
| 11 | + | + | + | + | + | + | + | + | + | |
| 12 | - | - | - | - | - | - | - | - | - | |
| 21 | G | G | G | G | G | G | G | G | G | |
| 22 | G | G | G | G | G | G | G | G | G | |
| 31 | | | | | | | | | | + |
| 32 | | | | | | | | | | - |
| 41 | G | G | G | G | | G | G | G | G | |
| 42 | G | G | G | G | | G | G | G | G | |
| 51 | + | + | + | + | | | + | + | | |
| 52 | - | - | - | - | | | - | - | | |
| 61 | G | G | G | G | | | G | G | | G |
| 62 | G | G | G | G | | | G | G | | G |
| 71 | | | | | | + | | | + | |
| 72 | | | | | | - | | | - | |
| 81 | G | G | G | | | | G | G | | G |
| 82 | G | G | G | | | | G | G | | G |
| 91 | + | + | + | | | | | + | | + |
| 92 | - | - | - | | | | | - | | - |
| 101 | G | G | G | | | G | | G | G | G |
| 102 | G | G | G | | | G | | G | G | G |
| 111 | | | | | | | + | | | |
| 112 | | | | | | | - | | | |
| 121 | G | G | | | | | | G | G | G |
| 122 | G | G | | | | | | G | G | G |
| 131 | + | + | | | | | | | + | |
| 132 | - | - | | | | | | | - | |
| 141 | G | G | | | | | G | | G | |
| 142 | G | G | | | | | G | | G | |
| 151 | | | | | | | | + | | + |
| 152 | | | | | | | | - | | - |
| 161 | G | | | | | | | | | |
| 162 | G | | | | | | | | | |
| 171 | + | | | | | | | | | |
| 172 | - | | | | | | | | | |
| 181 | G | | | | | | | G | | G |
| 182 | G | | | | | | | G | | G |
| 191 | | | | | | | | | | |
| 192 | | | | | | | | | | |
| 201 | | | | | | | | | | |
| 202 | | | | | | | | | | |
| 481 | G | G | G | G | G | G | G | G | G | G |
| 482 | G | G | G | G | G | G | G | G | G | G |

FIG. 6

INVENTOR
H. L. COYNE
BY J W Schmied
ATTORNEY

Patented May 20, 1952

2,597,570

UNITED STATES PATENT OFFICE 2,597,570

VARIABLE IMPULSE TRANSMITTER

Howard L. Coyne, Nassau, N. Y., assignor to Bell Telephone Laboratories, Incorporated, New York, N. Y., a corporation of New York Application December 23, 1948, Serial No. 67,009

10 Claims. (Cl. 177—380)

This invention relates to telephone systems, and, more particularly, to telephone signaling apparatus.

The conventional system for signaling a called subscriber comprises the ringing of the bells in the subscriber's set by the intermittent application of an alternating or pulsating direct current of a frequency generally in the vicinity of 20 cycles or pulses per second.

In the type of ringing customarily used in cities, hereinafter referred to as standard ringing, the current is applied for uniform durations of time at regular intervals. In two-party or four-party selective ringing, pulsating direct current is applied for uniform durations of time at regular intervals. In the type of ringing used on country lines, hereinafter referred to as code ringing, the current is applied for non-uniform durations of time.

In the conventional installation, these types of ringing are produced by the intermittent application of the output of a generator to the called line either under the control of an operator or under the control of an automatic interrupter.

An object of the present invention is to provide an economical and simple signaling apparatus capable of producing either standard, code, or party ringing.

Another object of this invention is an apparatus for producing a modulated pulsating voltage or a modulated alternating voltage.

A further object of the invention is to provide a signaling apparatus producing a ringing effect of improved aesthetic quality.

These objects have been attained, in the present invention, by the utilization of a multiple-wound voltage divider provided with a plurality of taps to which small direct current potentials are applied of preselected voltages and polarities. To provide an improved equivalent of standard ringing, two windings are employed, each of which is provided with a plurality of taps. Alternate taps on each of the wires may be grounded, the remaining taps on one of the wires being connected to a source of positive potentials, and the remaining taps on the other of the wires being connected to a source of negative potential. A brush, or wiper, in traversing the voltage divider windings, will produce a modulated alternating current which will produce a continuous ringing of modulated volume. By utilizing but one of the windings, a polarized continuous ringing of modulated volume may be produced for two-party or four-party selective ringing. By utilizing both windings and by selectively connecting the taps to ground or to sources of positive or negative potential, modulated-volume code ringing may be produced. The voltage divider may be formed in the shape of a cylinder whereby a continuous standard or party line ringing, or a repeating code ringing, may be obtained.

The invention may be more fully understood from the following detailed description made with reference to the accompanying drawings in which:

Fig. 6 presents, in tabular form, suggested arrangements for producing a variety of codes.

Figures 2, 3, 3A, 4, 5:
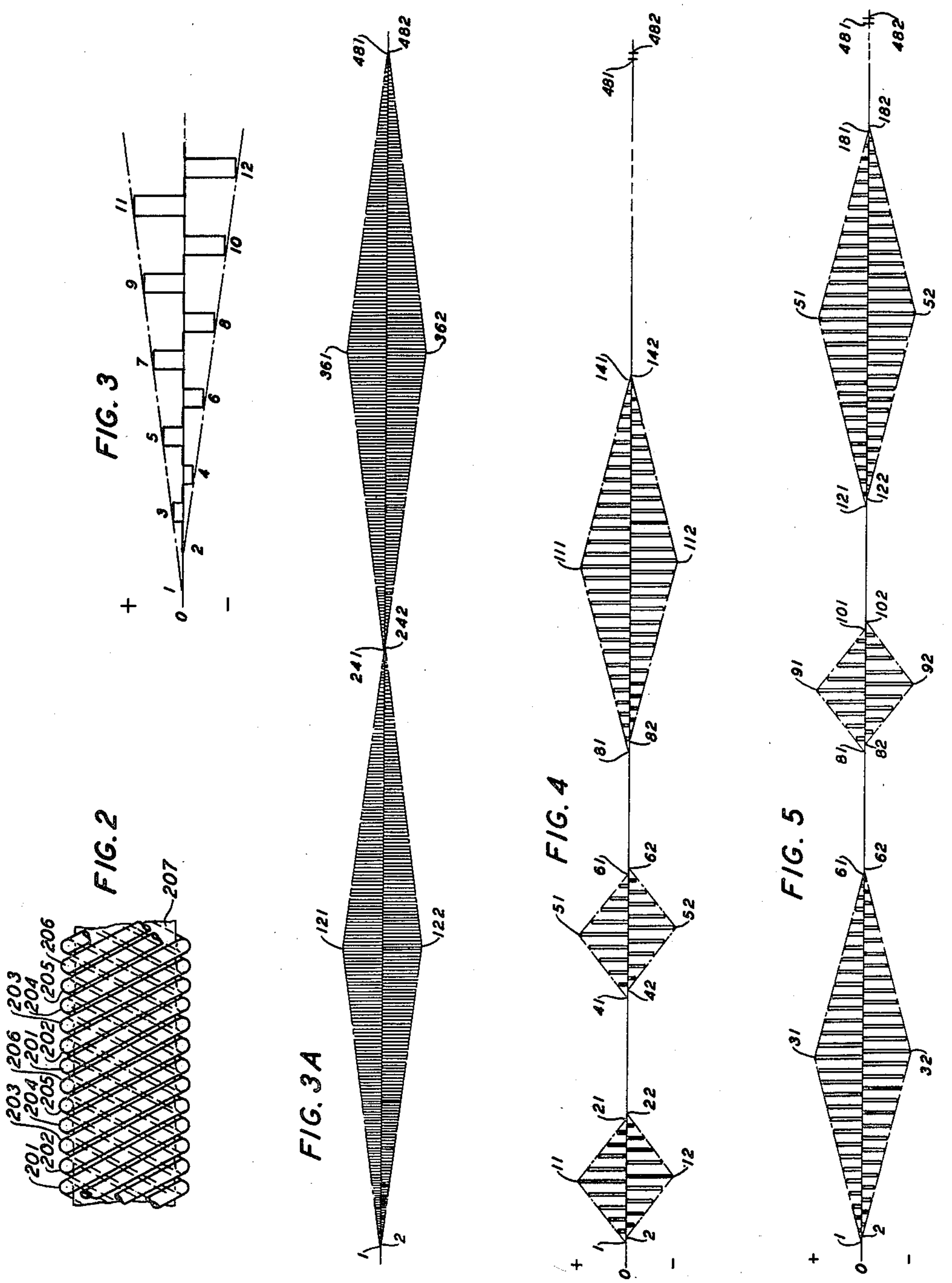
Fig. 2 shows a portion of the voltage divider used in the preferred embodiment of the invention.
Figs. 3 and 3A are representations of the output voltage of the voltage divider of the invention when arranged to produce continuous ringing of modulated volume.
Figs. 4 and 5 are representations of the output voltage of the voltage divider of the invention when arranged to produce two types of code ringing.

Referring first to Fig. 2, in the preferred embodiment of the invention, a series of six conductors 201–206 are wound upon an insulating card 207. Conductors 202, 203, 205 and 206 are electrically neutral and are provided for spacing, for insulation, and to prevent the voltage divider brush or wiper from bridging conductors 201 and 204. Therefore, other insulation means, or extensions of the insulating card 207, may be used in place of the neutral conductors. The conductors 201 and 204 may be selectively connected to a source of positive potential, a source of negative potential, ground, or to a combination of positive or negative potential and ground, as will be described hereinafter.

Figure 1:
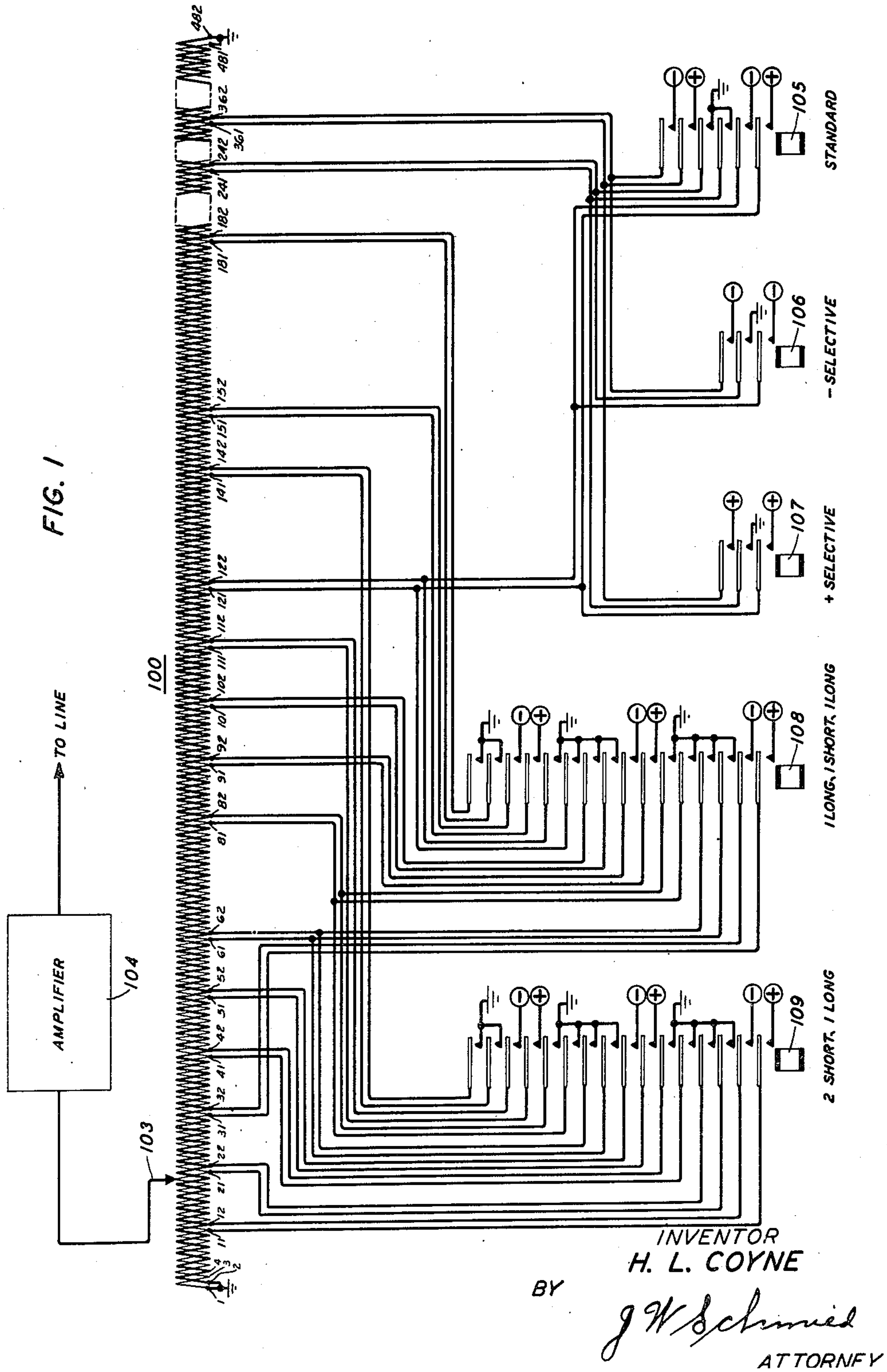
Fig. 1 is a schematic drawing of a voltage divider, an amplifying output circuit for said voltage divider, and exemplary means for controlling the type of ringing generated by the invention.

Referring now to Fig. 1, a voltage divider 100 is disclosed which may be wound in accordance with the disclosure of Fig. 2, although for purposes of clarity only the two active conductors, represented as conductors 201 and 204 in Fig. 2, have been shown. The voltage divider 100 is provided with a brush or wiper 103 which is arranged to traverse the length of the voltage divider 100 by means not shown. The various potential levels contacted by the brush 103 are amplified by any suitable apparatus 104, and passed to the line as ringing current. Each of the conductors of the voltage divider 100 is provided with a plurality of taps by means of which potentials may be applied to the windings. In Fig. 1, the odd-numbered taps 1, 11, 21, etc. are common to one of the conductors, and the even-numbered taps 2, 12, 22, etc. are common to the other conductor. The taps are connected to the conductors at the point at which the number of turns (and thus the length of the conductor) corresponds to the reference number of the taps, but it is to be understood that the location of the taps is determined from a consideration of the proportional resistance of the windings and has no necessary relation to the number of turns.

The taps may be located at suitably spaced intervals and may be connected to sources of potential or ground in any sequence required to perform the requisite functions. The connections for standard ringing, polarized selective ringing, and two varieties of code ringing have been disclosed in Fig. 1.

For standard ringing of the improved aesthetic quality provided hereby, multicontact relay 105 is operated either automatically or under the control of an operator. The operation of relay 105 will result in the placing, over obvious circuits, of a positive potential at taps 121 and 361, of a negative potential at taps 122 and 362, and of ground at taps 241 and 242. As shown, taps 1, 2, 481, and 482 may be permanently grounded. Therefore, each conductor of the voltage divider, in standard ringing, may be considered to be divided into four sections, with the first quarter length comprising a voltage divider with its terminals progressively increasing in potential from ground to a maximum positive or negative potential, with its second quarter length progressively decreasing from maximum positive or negative potential to ground, with its third quarter length progressively increasing from ground to maximum positive or negative potential, and with its fourth quarter length progressively decreasing from maximum positive or negative potential to ground. The potentials contacted by brush 103 in its traverse of the winding, when relay 105 is operated, may be represented as in Figs. 3 and 3A. Referring to Fig. 3, in which the "0" line represents ground potential, brush 103 contacts ground potential on the points of the winding associated with taps 1 and 2. As brush 103 again passes over the first conductor at point 3, it contacts a potential slightly positive relative to ground, shown as pip 3 in Fig. 3. As wiper 103 again passes over the second conductor at point 4, it contacts a potential slightly negative relative to ground, shown as pip 4 in Fig. 3. Wiper 103, in its traverse, continues to alternately contact the first and second conductors and thus progressively contacts sources of voltage regularly increasing in the respective positive and negative directions. Referring now to Fig. 3A, after brush 103 passes the points of maximum voltage 121 and 122, it contacts terminals at voltages of progressively decreasing magnitude, until ground potential is reached at points 241 and 242. The cycle of modulated voltage then repeats through maximum at points 361 and 362 to minimum at points 481 and 482. When this voltage is amplified and applied to the line, the means at the subscriber's premises responsive to ringing current, conventionally a set of bells, will sound, initially, at a low volume, will gradually become louder to the point of maximum volume and will then decrease to minimum volume. This cycle immediately repeats.

As may now be seen, the disclosed voltage divider is adapted to produce pulses of controllable polarity, magnitude, and frequency. The term "modulated voltage" used herein has been employed to describe the result of varying the amplitude or magnitude of a direct voltage. The apparatus described herein performs operations leading to that result; it may therefore be referred to as a means for producing a modulated voltage. The output of the apparatus when connected for standard ringing, as hereinbefore described, and when connected for code ringing, as hereinafter described, comprises pulses of alternating polarity and, therefore, for the purposes of this application, may be referred to as an alternating voltage. Therefore, the output may be referred to as a modulated alternating voltage, or, in the case of the polarized selective ringing, as a modulated pulsating voltage.

To provide continuously repeating ringing of modulated volume, the voltage divider card is preferably made in the form of a cylinder with the brush mounted on a rotatable shaft having its axis common with that of the cylinder. Thus, points 1 and 2 will be identical with points 481 and 482 on the voltage divider, and the ringing will continue until the called subscriber answers or the calling subscriber disconnects.

The maximum volume of the output may be controlled by the voltages applied to the voltage divider, which are preferably as low as one volt, or may be modified by the amplifying system 104. The period of the signal from minimum volume to maximum volume and back to minimum volume, and the frequency of the output current may be controlled in a number of ways. For instance, any of the variables in the following equation may be changed:

$$\frac{\pi d}{PK}=\frac{T}{t}f$$

where $d$=the diameter of the cylindrical card, in inches;
P=the period of the signal from zero to maximum to zero electromotive force, in seconds;
K=the number of periods per revolution;
T=the number of turns for one cycle;
$t$=the aggregate number of turns per inch; and
$f$=the frequency, in cycles per second.

The velocity at which the brush must be rotated may be readily ascertained from the following formula:

$$S_1=\frac{T}{t}f$$

where $S_1$ is equal to the peripheral speed of the brush in inches per second.

It is obvious that applying a factor of $$\frac{60}{\pi d}$$

to $S_1$ will provide the speed at which the brush shaft must be rotated in revolutions per minute. It may be noted that if, as disclosed, T is six turns per cycle, and $f$ is, as is conventional, 20 cycles per second, the winding of the voltage devided with 240 aggregate turns of wire per inch will require the peripheral speed of the brush to be but one-half inch per second.

In two- or four-party selective ringing, the means at the subscriber's premises responsive to the signaling current are polarized and the output voltage is also polarized, whereby through the combination of the two polarities with either the tip or ring conductor provides the requisite four-party selective ringing. The present disclosure is adapted to provide selective ringing of modulated volume by utilizing but the positive or negative portion of the representation of Fig. 3A. To provide negative polarity voltages for selective ringing, multicontact relay 106 is operated. The operation of relay 106 will place a negative potential on the conductor at taps 122 and 362, and will place ground at tap 242. The other conductor will be at ground potential throughout its length. Therefore, an output of negative polarity will be generated representable by that portion of Fig. 3A below the zero line. To provide positive polarity voltages for selective ringing, multicontact relay 107 may be operated. The operation of relay 107 will place a positive potential on the conductor at taps 121 and 361, and will place ground at tap 241. The other conductor will be at ground potential throughout its length. Therefore, an output of positive polarity will be generated representable by that portion of Fig. 3A above the "0" line.

Where a plurality of parties are on the same line, code ringing is generally employed to call a particular subcriber on that line. Several of the possible codes are set forth in tabular form in Fig. 6 to demonstrate a possible arrangement of the association of the potentials with the several taps on the two conductors to provide the desired ringing code. The letter "G" therein represents ground.

As an example, according to the chart of Fig. 6, to obtain two short rings followed by one long ring, a positive potential is applied to taps 11, 51, and 111, a negative potential is applied to taps 12, 52, and 112, and ground is applied to taps 1, 2, 21, 22, 41, 42, 61, 62, 81, 82, 141, 142, 481, and 482. This condition may be established through the operation of multicontact relay 109 in Fig. 1. As the brush 103 passes over the voltage divider, a modulated voltage will be generated as represented in Fig. 4. It is customary to provide a "short" ring of a duration of one-half second, a "long" ring of a duration of one and one-half seconds, an interval of one-half second between rings within the code, and an interval of at least six seconds between codes. Therefore, in Fig. 4, a modulated current of 20 cycles per second is generated for two one-half-second intervals each followed by a one-half-second pause, and current is then generated for one and one-half seconds. Therefore, it requires three and one-half seconds to transmit the two short rings followed by one long ring. With the presumed parameters whereby a 20-cycle per second current is generated, it will require approximately twelve seconds for the brush to traverse the voltage divider. Therefore, with this particular code, there will be a delay of eight and one-half seconds before the code is repeated.

Referring again to Fig. 6, as another example of code ringing, to generate a signal comprising a long ring followed by a short ring, followed by a long ring, ground is connected to taps 1, 2, 61, 62, 81, 82, 101, 102, 121, 122, 181, 182, 481, and 482, a source of positive voltage is connected to taps 31, 91 and 151, and a source of negative voltage is connected to taps 32, 92, and 152. These connections may be established by the operation of multicontact relay 108 in Fig. 1. The output is represented in Fig. 5 as a one-and-one-half-second "long" ring, a one-half-second pause, a one-half-second "short" ring, a one-half-second pause, and a one-and-one-half-second "long" ring, each of these rings being of modulated volume. Thus a total time of approximately four and one-half seconds has elapsed and an interval of approximately seven and one-half seconds will expire before the code is repeated. In the cases of the shorter rings, such as "1 short," "2 short," "3 short," and "1 short, 1 long," it may be found desirable to have the code repeat in the same revolution of the brush, i. e., a duplication of the connections to the taps recommencing at the center terminals 241 and 242.

It is believed to be apparent that if ringing of a non-modulated volume is desired for any or all of the several general types of ringing, this may be accomplished by strapping or otherwise connecting a common potential to the individual conductors, or to portions thereof. This may be done to provide a signal that is equivalent to those presently used, with the advantages of low initial and maintenance cost and minimum operating expense still accruing. It is also believed to be apparent that the connections may be varied to produce any of a variety of wave forms.

To demonstrate the capabilities of the invention, a single voltage divider has been disclosed with means associated therewith to provide a plurality of types of ringing. It is contemplated, however, that a plurality of voltage dividers may be provided, each adapted to generate but one of the several possible types of ringing.

It is to be understood that the location and numbering of the taps, the relation of the taps to the number of turns, the frequency of the output current, the duration of the rings, and the other indicated or suggested variables, are purely illustrative and that they and the other characteristics of the invention may be readily modified to meet a variety of requirements. Although the invention has herein been embodied in a telephone signaling apparatus, it is to be understood that the invention may find application in a variety of fields.

What is claimed is:

1. In a telephone signaling apparatus, signal generating means comprising a voltage divider, two windings therefor, a source of potential of one polarity connected to one of said windings at a plurality of points thereon, a source of potential of the opposite polarity connected to the other of said windings at a plurality of points thereon, a source of ground potential connected to said windings at points intermediate the points to which said sources of potential are connected, and a brush continuously traversing said windings, whereby a modulated alternating voltage is produced.

2. In a telephone signaling apparatus, signal generating means for producing code ringing comprising a voltage divider, sources of selected potentials connected to the windings of said voltage divider at a plurality of points thereon selected in accordance with the code to be produced, sources of ground potential connected to the winding of said voltage divider at a plurality of different points thereon, at least two adjacent ones of said points having ground potential applied thereto, and a brush traversing the windings.

3. In a telephone signaling apparatus, signal generating means for producing code ringing comprising a bifilar-wound voltage divider, a first source of potential connected to the bight of said bifilar winding, sources of selected potentials connected to the winding of said voltage divider at one side of the bight at a plurality of points thereon, sources of selected potentials connected to the winding of said voltage divider at the other side of the bight at a plurality of points thereon, said points being selected in accordance with the code to be produced, and a brush traversing the windings, whereby an output voltage is produced in accordance with the desired code.

4. In a telephone signaling apparatus, signal generating means for producing code ringing comprising a voltage divider, two windings therefor, a source of potential of one polarity and a source of ground potential each connected to one of said windings at a plurality of points thereon, a source of potential of the opposite polarity and a source of ground potential each connected to the other of said windings at a plurality of points thereon, said points being selected in accordance with the code to be produced, and a brush traversing said windings, whereby an output voltage is produced in accordance with the desired code.

5. In a telephone signaling apparatus, signal generating means comprising a voltage divider having two windings, a first source of fixed potential connected only to one of said windings at a plurality of fixed points thereon, a second source of fixed potential connected only to the other of said windings at a plurality of fixed points thereon, and a brush traversing said windings.

6. In a telephone signaling apparatus, signal generating means comprising a voltage divider having two windings, a first source of fixed potential connected only to one of said windings, a second and different source of fixed potential connected only to the other of said windings, a third and different source of fixed potential connected to each of said windings, and a brush traversing said windings.

7. In a telephone signaling apparatus, signal generating means comprising a voltage divider having two windings, a first source of fixed potential connected only to one of said windings at a plurality of fixed points thereon, a second and different source of fixed potential connected only to the other of said windings at a plurality of fixed points thereon, a third and different source of fixed potential connected to each of said windings at a plurality of fixed points thereon, and a brush traversing said windings.

8. In a telephone signaling apparatus, signal generating means comprising a voltage divider having two windings, each turn of each winding lying adjacent the corresponding turn of the other winding, a source of potential of one polarity connected to one of said windings, a source of potential of the opposite polarity connected to the other of said windings, and a brush traversing said windings, whereby an alternating voltage is produced.

9. In a telephone signaling apparatus, signal generating means comprising a voltage divider having two windings, each turn of each winding lying adjacent the corresponding turn of the other winding, a first source of potential connected to one of said windings at a plurality of points thereon, a second source of potential connected to the other of said windings at a plurality of points thereon, and a brush traversing said windings.

10. In a telephone signaling apparatus, signal generating means comprising a voltage divider having two windings, each turn of each winding lying adjacent the corresponding turn of the other winding, a first source of potential connected to one of said windings, a second and different source of potential connected to the other of said windings, a third and different source of potential connected to each of said windings, and a brush traversing said windings.

HOWARD L. COYNE.

REFERENCES CITED

The following references are of record in the file of this patent:

UNITED STATES PATENTS

| Number | Name | Date |
|---|---|---|
| 834,869 | Butler | Oct. 30, 1906 |
| 899,629 | Shoemaker | Sept. 29, 1908 |
| 1,279,882 | Kuhn | Sept. 24, 1918 |
| 1,637,080 | Kesses | July 26, 1927 |
| 1,976,548 | Field | Oct. 9, 1934 |
| 2,197,636 | Faus | Apr. 16, 1940 |
| 2,333,406 | Ballard | Nov. 2, 1943 |